United States Patent Office 3,752,700
Patented Aug. 14, 1973

3,752,700
METHOD OF IMPREGNATING PAPER
Rolf Dahl, West Columbia, S.C., assignor to Continental Tapes, Incorporated, Columbia, S.C.
No Drawing. Original application June 29, 1970, Ser. No. 50,953. Divided and this application Mar. 22, 1972, Ser. No. 236,958
Int. Cl. C08c 17/16; C08d 13/16
U.S. Cl. 117—155 R                    3 Claims

ABSTRACT OF THE DISCLOSURE

Very rapid catalytic formation and polymerization of polyurethane polymers followed by cross-linking with complex, hindered polyamines permits one step, in-situ and continuous production of new types of pressure-sensitive adhesives and impregnated permeable materials.

---

This application is a divisional application of Ser. No. 50,953, filed June 29, 1970.

As I have shown in my patent, U.S. Pat. No. 3,437,622, certain polyurethane polymers can be used in place of the usual elastomers (natural and synthetic rubber) to produce pressure-sensitive adhesives. Furthermore, as shown in my copending application Ser. No. 23,983, filed Mar. 30, 1970, and now U.S. Pat. No. 3,702,781, certain such polymers are of great advantage in impregnating certain permeable materials containing active hydrogen, such as paper, to greatly increase dry and wet strength and delamination resistance.

I have now discovered that such polymers suitable both for making pressure-sensitive adhesives and for such impregnation, can be formed and polymerized followed by cross-linking by reaction with certain polyamines, so rapidly in the presence of suitable catalysts as to permit the whole process to be carried out in one step and continuously. This, of course, results in marked simplification and cost reduction in forming a sheet or strip of adhesive which may be (1) formed separately and subsequently transferred to a backing material (2) applied directly to a backing material (3) impregnated into certain permeable materials or even (4) applied to certain permeable materials to impregnate them and, at the same time, leave thereon a coating of pressure-sensitive adhesive so as to yield, for example, a product that can be slit and wound to form rolls of pressure-sensitive adhesive tape with an impregnated paper backing. My new procedures also, of course, avoid the need for making a "prepolymer" as has been require heretofore.

The following examples are illustrative of my procedures and products, modifications and extensions of which within the scope of my invention, will be apparent to those skilled in the art.

EXAMPLE 1

92 grams of a triol of hydroxyl number 48 and molecular weight about 3500 (Niax 1446, a polyether triol made by Union Carbide Chemicals Co., New York, N.Y.) was mixed with 8 grams of commercial tolylene diisocyanate (80% 2,4- and 20% 2,6-tolylene diisocyanate, hereinafter some times called TDI), 0.8 gram 4,4'-methylene-bis-o-chloroaniline, 1 gram stannous octoate catalyst, 40 grams of a 66⅔ by weight solution in toluene of the glycerol ester of resin and 40 grams of a 66⅔ weight percent solution in toluene of non-heat-reactive phenol-formaldehyde resin. The mix was immediately spread on an impregnated paper (see my copending application, Ser. No. 23,983, filed Mar. 30, 1970, and now U.S. Pat. No. 3,702,781, and dried and cured at 250° F. for 2 to 3 minutes to yield a pressure-sensitive tape material containing 5 grams of cured and dry adhesive per square foot.

The tape had good tack and remained well adhered to a polished steel surface in which it left no residue when stripped after being heated thereon for 17 minutes at 325° F.

EXAMPLE 2

92 grams of the triol of Example 1 was mixed with 7.4 grams TDI (OH:NCO equals 1:1), 40 grams of a 66⅔ solution by weight of the glycerol ester of resin in toluene, 40 grams of a 66⅔ weight percent solution of non-heat-reactive phenol-formaldehyde resin in toluene and 1 gram stannous octoate. The mix was immediately spread on an impregnated paper as in Example 1 and similarly dried and cured. The product was a good pressure-sensitive adhesive as in Example 1 but it left a slight residue after being adhered to a polished steel surface and heated for 17 minutes at 325° F.

EXAMPLE 3

92 grams of the triol of Example 1 was mixed with 9 grams TDI, 40 g. glycerol ester of rosin 66⅔ wt. percent solution in toluene, 40 grams 66⅔ wt. percent solution of non-heat-reactive phenol-formaldehyde resin in toluene, 15 grams 4,4'-methylene-bis-o-chloroaniline and 1 gram stannous octoate. The mix was immediately spread and cured as in Example 1. The product was a pressure-sensitive adhesive as in Example 1 but showed even greater resistance to heat than the product of Example 1.

EXAMPLE 4

As in Example 1, 92 grams of the same triol was heated at 212° F. for about 1 hour until all the OH groups of the triol had reacted with 8 g. TDI mixed therein. To this prepolymer was added the same amounts of solutions of resins, diamine and catalyst as in Example 1. The mix had a useful life of about 2 hours before its viscosity became too high. The freshly-made mix was spread, dried and cross-linked as in Example 1, but of course, the procedure of Example 1 was much simpler and more economical. The product was similar to that of Example 1.

EXAMPLE 5

The mix of Example 1, but without the solutions of rosin ester and phenol-formaldehyde resin, for which was substituted 26 grams of toluene as solvent, was coated on raw, untreated paper in amount to leave 5 g. dry adhesive per sq. ft. on the coated side. The so-coated paper was dried and cured as in Example 1. The paper backing was wet through by the solution and thoroughly impregnated but the solution did not run through excessively to the back-side. The product was suitable as a protective tape (low adhesion) and the backing paper had increased in dry tensile strength from 9 to 27 pounds per inch of width, the wet tensile from 0 to 18 lbs./inch and the delamination resistance (force needed to continue splitting of the paper is thickness) from 6 to 40 ounces per inch of width. If desired to be provided in roll form, the back-side can be treated with a release-coating material. Suitable such materials are applied in a solvent and comprise vinyl stearate, maleic anhydride, acrylic anhydride, polyamide or a silicone.

EXAMPLE 6

The adhesive solution of Example 1 was coated on the silicone-treated side of a high-density polyethylene strip or liner in amount to leave a final, dry coating of 10 grams per square foot. The adhesive-coated side of the liner was rolled up in contact with a matching strip of uncured natural rubber which had been compounded on the rubber mill to contain 50 wt. percent diatomaceous earth filler, 2.5% stearic acid, 1.7% sulfur and 0.4% of the vulcanization-accelerator, mercaptobenzothiazole. A large roll was heated in an oven at 250° F. for up to 24 hours in order to heat through the roll, evaporate the solvent and cure and cross-link the adhesive and vulcanize the rubber backing. The product was a good pressure-sensitive adhesive that could be cut into sheets or slit and rolled into convolutely-wound rolls as desired. When used, the polyethylene liner released easily from the adhesive and the adhesive layer was firmly anchored to the cured rubber backing. The rubber used may be natural or synthetic. Other liners can be used as long as they will not adhere too strongly to the adhesive and will withstand the temperature. Suitable ones are strips or sheets of polypropylene or polyamide. Normally they are provided with a release coating as mentioned above. After the required heating and curing, the cooled product must release the liner without substantially disrupting the adhesive layer or loosening it from its backing. Other inert, finely-divided fillers can be used such as pearlite, calcium carbonate or clay; in amounts up to 50% by wt. Other proportions of sulfur and vulcanization accelerators can be used such as listed in The Vanderbilt Latex Handbook, p. 163, R. T. Vanderbilt Co., Inc., 230 Park Ave., New York, N.Y., 1954 edition.

The ingredients of the adhesive can be continuously measured into a mixing chamber (with spiral vanes or mechanical stirrer) and continuously fed to coat upon a liner or backing which may pass directly and continuously through a drying and curing oven. When heated in roll form batchwise, of course, time must be allowed for the heat to penetrate to the interior of the roll—the larger the roll, the longer time.

Pigments such as titanium oxide may be used in amounts up to 10 wt. percent to color any of my adhesives which are normally transparent. Also antioxidants can be used in amounts of 0.5 to 1 wt. percent of the polyol, such as 2,6-di-tertiary-butyl-para-cresol, butylated hydroxy toluene, phenyl-alpha-naphthylamine or the condensation product of butyraldehyde and aniline; of which I prefer the first two.

Suitable amines for my adhesives are (1) aromatic (aryl) diamines or polyamines with 2 to 3 phenylene groups or 2 phenylene groups and 1 or 2 alkylene groups between at least 2 of the amino groups and with the amino groups sterically or otherwise hindered by neighboring groups such as Cl, Br, I, OH, ether group or aromatic or aliphatic hydrocarbon radical or other negative group, in a position ortho to the amine groups. These so-called negative groups inherently, by their mere proximity, decrease the reactivity of the neighboring amino group and if the hindering group is bulky, the amino group is sterically hindered. Typical of suitable amines is 4,4'-methylene-bis-o-chloroaniline which is very effective and available. Other polyamines with suitably hindered amino groups are, for example, (1) alpha,alpha'-bi-p-toluidine

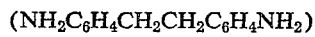

when it has a negative group such as Cl substituted on the benzene ring next to each amino group (2) 3,3'-dichlorobenzidine ($NH_2ClC_6H_3C_6H_3ClNH_2$) which also has a chlorine atom substituted on the benzene ring next to (ortho to) each amino group, (3) 3,3'-dimethyl-benzidine ($NH_2CH_3C_6H_2C_6H_3CH_3NH_2$) which has a methyl group substituted on the benzene ring next to each amino group. In addition to having relatively, inactive amino groups, my amines must thus have at least 2 amino groups widely enough separated to be able to bridge or cross-link my polyurethane polymers. The nature of the atoms or groups that separate the amino groups is not critical since only those close to the amino groups will greatly affect their reactivity. However, from the standpoint of stability, availability and simplicity of chemical constitution these intervening groups will normally be phenylene or phenylene and alkylene groups and, of course, the compounds will normally be aryl(aromatic) amines rather than amines of purely aliphatic nature. Furthermore, it should be noted that such aryl amines, as is the case with aniline, are readily halogenated (at least by chlorine or bromine) in an inert, non-aqueous solvent (such as acetic acid) to form substitution products with halogen ortho to the amino group, which makes amines such as (1) and (2) above, readily available. If adequate cross-linking does not occur in formation of my adhesives, they lack internal strength and heat-resistance. It is thus required that the amino groups be unreactive enough so that the polyols and isocyanates can react to form polyurethane polymers before the isocyanates extensively react with the amino groups and thus, presumably, that the amino groups react with isocyanate-group-terminated polymers and with residual isocyanate. It appears that the tin catalysts I use accelerate the formation of polyurethane polymers much more than they accelerate reaction of isocyanate with amine groups. It should be noted that, even though all OH groups in the polyols are reacted with isocyanate, there still remain polymers with terminal isocyanate groups that can react with my amines.

When I am operating a continuous process, my adhesive, as indicated, may also be applied to a backing material such as paper that has already been impregnated in any of the usual ways, for example, with a synthetic rubber solution, or with my polyurethane polymers usually without tackifying resin as in Example 5. Also the backing may be provided with a release coating prior to my application of adhesive. Otherwise, a release coating may be applied between sections of the oven I use to dry and cure my adhesive, using a roll coater under the web, which dips into a solution of the release coating; or the solution of release coating may be sprayed on the backside of the web after my adhesive is partially dried and cured. Satisfactory release coatings are those herein described. To the usual materials I may also add 5–10 wt. percent calcium stearate to impart a smooth, wavy feel.

I find it very satisfactory, as a method of mixing my adhesive solution ingredients, to meter them in liquid or solution form by means of diaphragm or proportioning pumps, for example, the TDI through one jet into a small chamber where it directly meets an opposing jet comprising a solution of the balance of the ingredients, namely for example, polyol, solvent, catalyst, resin and amine. The mix from the chamber is then directly coated on the backing. Thus the mixing and coating are almost instantaneous; and the ingredients to be mixed are perfectly stable and can be prepared as much in advance of use as required.

Catalysts I use are stannous octoate, dibutyl tin dilaurate, cobalt naphthenate, lead naphthenate, bismuth naphthenate, lead laurate, phenyl mercuric benzoate, phenyl mercuric acetate, stannous neodecanoate, the stannous salts of the organic carboxylic acids of 1 to 22 carbon atoms per molecule or any of these mixed with 10 to 100% of their wt. of a tertiary amine such as triethyl amine and including the catalysts of U.S. Pat. 3,397,158; 3,392,128 and 3,398,106. In general I prefer stannous octoate or stannous neodecenoate. When I use stannic compounds such as dibutyl tin laurate and the above remaining catalysts I prefer to add 10 to 100% of their weight of a tertiary amine such as triethyl amine which has a synergistic action with them. The amount of metal compound catalyst used is from 0.5 to 5% the weight of polyol.

The polyols I use are: (1) diols of hydroxyl number from about 56 to 265 and of molecular weight from about 400 to 3000; (2) triols of hydroxyl number from about 28 to 56 and molecular weight from about 3000 to 10000; (3) mixtures of the triols of (2) with 10 to 90% by weight of the diols of (1). I prefer the above-described triols. These polyols include substituted or unsubstituted polyalkylene ether glycols, polyhydroxy polyalkylene ethers and especially the relatively cheap and readily available ethylene and propylene oxide adducts of diols and triols.

Suitable polyols are also those of my copending application, Ser. No. 23,983, series of 1960, comprising those of mol. wt. from about 800 to 3500 and mixtures of polyols of mol. wt. from about 400 to 4400 having average mol. wts. in the range from about 800 to 3500. Similar polyhydroxy polyesters are also useable but are much more expensive and generally less satisfactory.

As tackifying resin I may use non-heat-reactive or heat-reactive phenol-formaldehyde resins, the latter having added polyol. These result in a firmer adhesive mass than with the other resins mentioned and the heat-reactive resin is used in adhesives for use above 250° F. The use of these resins gives better aging and high temperature resistance and I prefer them.

Although I prefer any of the isomeric diisocyanates of toluene because of cheapness and availability, other aromatic polyisocyanates can be used such as those of ethyl benzene, xylene, bitolylene, biphenyl, diphenyl methane, methyl diphenyl methane, dianisidine, diphenylxenylene, dichloroxylene, dimethoxy biphenyl, etc. Herein, unless otherwise noted, by tolylene diisocyanate I mean any isomer or mixture of isomers of tolylene diisocyanate.

As solvents, although I prefer toluene, I may use benzene, xylene; toluene with up to 25% of its weight of heptane or other volatile, inert aliphatic or naphthenic hydrocarbons; acetates of the monomethyl or monoethyl ether of ethylene glycol; ethyl or butyl acetate; or various volatile, inert ethers or ketones.

Tackifying resins are used in amounts from 0 to 100% of the weight of polyol. Such resins can be the ethylene glycol or glycerol esters of rosin or tall oil, terpene resins, coumarone-indene resins or polymerized unsaturated petroleum hydrocarbon residues. Generally I prefer resins and plasticizers of low acid number—below about 10—so as not to contain substantial capacity for reaction with isocyanate. Plasticizers to improve quick-stick, such as chlorinated diphenyl, the ethylene glycol ester of rosin or the methyl ester of hydrogenated rosin, may be used in amounts from about 5 to 25% of the weight of polyol; but normally they are not needed. As a matter of fact I prefer in my simplified process to use as tackifying and plasticizing material only non-heat-reactive phenol-formaldehyde resins in amounts from about 0 to 100% of the weight of polyol since this gives better aging and heat resistance than the conventional materials. However, for adhesives to be used at temperatures above 250° F., I may use a heat-reactive phenol-formaldehyde resin which is one containing polyol. Even without tackifying resin or plasticizer my adhesives are tacky enough for use as "protective" tape.

It will be noted from my examples that I use a small proportion of solvent when I am using a continuous process without formation of a prepolymer so that the adhesive can be spread directly without its running off or through the backing excessively. Thus my adhesive solution usually contains only 15 to 25 wt. percent solvent or 85 to 75% solids. Coating weight may vary from about 4 to 11 grams per sq. ft., dry basis. If in the procedure of Example 5, only enough (20–80% of original wt. of paper, in solution solids) of solution is used to saturate (impregnate) the paper, any excess being removed, for example by squeeze rolls), I can produce impregnated paper of the properties stated. This can be done in a continuous process. Permeable materials other than paper can be satisfactorily so impregnated so long as they contain groups with isocyanate-reactive hydrogen—so called "active" hydrogen.

Having thus described my invention, what I claim is:

1. The method of impregating a permeable material containing groups with isocyanate-reactive hydrogen which comprises the steps of saturating said material to the extent of from 20 to 80% of its original weight of dry solids, with a substantially uniform solution containing from about 75 to 85 weight percent solid in an inert, volatile solvent, said solution containing: (1) polyols selected from the class consisting of polyols of molecular weight from about 800 to 3500 and mixtures of polyols of molecular weight from about 400 to 4400 having average molecular weights in the range from about 800 to 3500; (2) an aromatic polyisocyanate in amount such that the number of equivalents of isocyanate is from about 1.1 to 2 times the number of equivalents of hydroxyl in said polyols; (3) an aromatic polyamine in amount from about 80 to 100% of the number of equivalents of excess isocyanate groups in said polyisocyanate, wherein at least 2 of the amino groups are separated by a distance in the molecule at least about equal to that represented by the lengths of the groups selected from the class consisting of (a) 2 to 3 phenylene groups and (b) 2 phenylene groups plus 1 to 2 methylene groups, and wherein said amino groups are relatively unreactive, being hindered by a negative group in a position ortho to them on the same phenyl group, said negative groups being at least one of those selected from the class consisting of chlorine, bromine, iodine, hydroxyl, ether, aromatic and aliphatic hydrocarbon radicals and (4) a catalyst in amount from about 0.5 to 5% of the weight of said polyols, to accelerate the polyol-isocyanate reaction; and removing any excess of said solution from said permeable material and heating said impregnated permeable material at a temperature of about 250° F. for a time sufficient to evaporate said solvent and to substantially completely react the isocyanate groups with said polyols and said polyamine.

2. The process of claim 1 wherein the said solvent is toluene, the said permeable material is raw paper, the said polyisocyanate is tolylene diisocyanate, the said polyamine is 4,4'-methylene-bis-o-chloroaniline and the said catalyst is stannous octoate.

3. The process of claim 2 wherein the said catalyst is dibutyl tin dilaurate plus 10 to 100% of its weight of triethyl amine.

References Cited
UNITED STATES PATENTS

| | | | |
|---|---|---|---|
| 3,246,049 | 4/1966 | Webber | 117—122 X |
| 3,423,344 | 1/1969 | Odinak et al. | 260—77.5 X |
| 3,532,652 | 10/1970 | Zang et al. | 117—122 X |
| 3,274,322 | 9/1966 | Scudder | 117—161 UX |
| 3,164,568 | 1/1965 | Nordt et al. | 117—161 X |
| 3,284,377 | 11/1966 | Merten et al. | 260—77.5 X |
| 3,437,622 | 4/1969 | Dahl | 117—122 X |
| 2,929,800 | 3/1960 | Hill | 260—77.5 |
| 3,188,302 | 6/1965 | Lorenz | 260—77.5 |
| 3,917,489 | 12/1959 | Gladding et al. | 260—77.5 |

WILLIAM D. MARTIN, Primary Examiner

B. D. PIANALTO, Assistant Examiner

U.S. Cl. X.R.

117—161 KP; 260—22, 26, 77.5 AQ, 77.5 AM, 858

UNITED STATES PATENT OFFICE
CERTIFICATE OF CORRECTION

Patent No. 3,752,700      Dated August 14, 1973

Inventor(s) Rolf Dahl

It is certified that error appears in the above-identified patent and that said Letters Patent are hereby corrected as shown below:

Col. 1, line 50, "require" should be -- required --.

Col. 1, line 65, "resin" should be -- rosin --.

Col. 1, line 70, replace the 3rd comma by bracket to end parenthesis.

Col. 2, line 2, replace "in" by -- on --.

Col. 2, line 8, replace "resin" by --rosin --.

Col. 2, line 56, delete "is" and replace "paper" by -- paper's --

Col. 4, line 37, replace "wavy" by -- waxy --.

Signed and sealed this 22nd day of January 1974.

(SEAL)
Attest:

EDWARD M. FLETCHER, JR.          RENE D. TEGTMEYER
Attesting Officer                Acting Commissioner of Patents